UNITED STATES PATENT OFFICE.

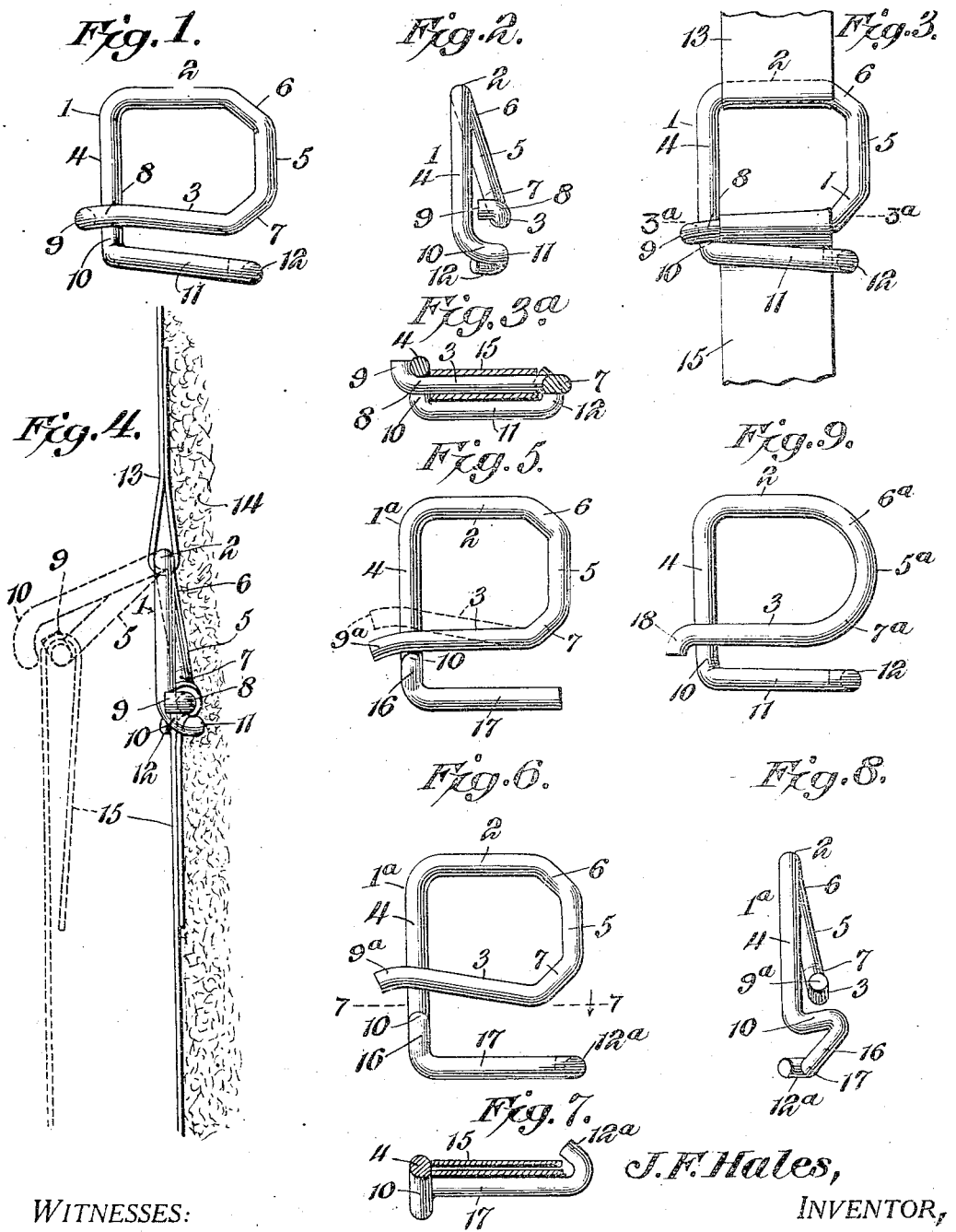

JOHN F. HALES, OF MEMPHIS, TENNESSEE, ASSIGNOR TO HENDERSON P. CHILDRESS, OF MEMPHIS, TENNESSEE.

BALE-TIE BUCKLE.

1,251,226.  Specification of Letters Patent.  Patented Dec. 25, 1917.

Application filed December 28, 1915. Serial No. 69,078.

*To all whom it may concern:*

Be it known that I, JOHN F. HALES, a citizen of the United States, residing at Memphis, in the county of Shelby and State of Tennessee, have invented a new and useful Bale-Tie Buckle, of which the following is a specification.

This invention has reference to bale tie buckles, and its object is to provide a buckle to which the band may be quickly applied, and in which there is no liability of the buckle pulling out or the band rending when subjected to the expansive force of the bale.

In accordance with the present invention the buckle consists of a single piece of wire in the form of a loop having two end bars and two side bars, so that the loop is of general rectangular shape. One end of one of the side bars is bent so as to form a hook or shoulder outstanding from the general plane of the buckle, and from thence is continued toward the other side of the bar and terminates in a hook returned toward the general plane of the buckle. The continuation is of a length to extend crosswise of an applied bale band, with one edge of the bale band engaging against the outstanding end of the side bar and the other edge of the bale band engaged by the hook at the termination of the continuation or extension. The corresponding end bar of the buckle is of a length to cross the side bar having the extension, and this end bar at its free end terminates in a hook directed toward the side bar it crosses. In the initial condition of the buckle the free end bar is spaced sufficiently from the side bar it crosses, and also from the continuation of the side bar to permit threading on to the end bar the looped end of the bale band, with said looped end of the bale band engaged by the extension of the side bar in such a manner that when the bale band and buckle are under the expansive force of the bale, the band is cramped between the end bars and the extension of the side bar with the parts interlocked in a manner effectively preventing drawing out of the buckle or rending of the bale band, while the extension of the side bar furthermore directs the free end bar of the buckle positively into engagement with the offstanding hook portion of the side bar.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is an elevation of a buckle embodying the invention, the view being that of the bale side of the buckle.

Fig. 2 is an edge view of the buckle of Fig. 1 as seen from the left hand side thereof.

Fig. 3 is a view similar to Fig. 1 but showing the bale band applied, with the parts in the positions assumed under the expansive force of the bale.

Fig. 3$^a$ is a section on the line 3$^a$—3$^a$ of Fig. 3.

Fig. 4 is an edge view of the buckle in position upon a bale with the band applied and the buckle expanded, and also showing in dotted lines the position of the buckle during the application of the looped end of the band.

Fig. 5 is a view similar to Fig. 1 showing a somewhat different form of buckle.

Fig. 6 is a view similar to Fig. 1 and combining features of both Figs. 1 and 5.

Fig. 7 is a section of the buckle on the line 7—7 of Fig. 6, and also showing a portion of the bale band.

Fig. 8 is an edge view of the structure of Fig. 6 as seen from the left hand side thereof.

Fig. 9 is a view similar to Fig. 1 but showing a somewhat modified form thereof.

It is customary to form the buckles of wire of a gage suitable for the purpose.

In Fig. 1 and associated figures there is shown a one-piece wire loop 1 of generally rectangular form, the loop consisting of end bars 2, 3, and side bars 4, 5, respectively. For a purpose which will hereinafter appear the connections between the side bar 5 and the end bars 2 and 3 are made by way of more or less angular bends 6, 7, respectively, although such particular arrangement is not obligatory. In the form shown in Fig. 9 the side bar 5 merges into the end bars 2 and 3 by curves 6ᵃ and 7ᵃ instead of more or less angular bends, as shown in Fig. 1 and others of the figures.

The end bar 3 is somewhat longer than the end bar 2 and terminates in a free extremity 8 crossing the side bar 4 and extending to a point outside of the loop of the buckle, the crossing being on the bale side of the buckle. Such extremity 8 exterior to the buckle has a bend 9 toward the general plane of the buckle, so positioned that when the end bar 3, which is initially spaced from the plane of the buckle on the bale side thereof, is forced toward such plane, the bent end 9 is in position to engage the outer edge of the side bar 4, thus preventing lateral spread of the buckle; that is, separation of the side bars 4 and 5.

The side bar 4 is of greater length than the side bar 5, so as to project beyond the end bar 3 on the side thereof remote from the end bar 2, where the side bar 4 has a bend 10 projecting from the general plane of the buckle on the bale side thereof, and at the outer end of the bend 10 there is provided a continuation 11 of the side bar 4, so bent as to extend crosswise of the buckle toward the side bar 5 on the bale side of the plane of the buckle in or approximately in parallelism with the end bar 3, although as shown in Fig. 1 the end bar 3 may have a slight curvature with the convex side toward the end bar 2 and the extension 11 may project at a slightly obtuse angle to the side bar 4.

The free extremity of the extension 11 is formed into a hook 12 directed toward the plane of the buckle and returned slightly toward that side of the buckle formed by the side bar 4. The length of the extension 11 from the projection 10, which latter serves as a shoulder, is about or a little greater than the width of a bale band for a purpose which will hereinafter appear.

In the use of the buckle it is applied to one looped end 13 of a bale band with such looped end encircling the end bar 2, such application being usually made prior to the placing of the band about the bale, which latter shown in part at 14 is assumed to be in a highly compacted condition within the compress. After the band has been placed about the bale the buckle, which is then usually pendent, is lifted about the axis of the end bar 2 to a position about that shown in dotted lines in Fig. 4, whereupon the other end of the bale band is formed into a loop 15 and is threaded upon the end bar 3, the buckle being rocked through the loop 13 sufficiently to permit the introduction of the bale band loop 15 in front of the extension 11, that is, on the side thereof remote from the bale, whereupon the buckle is rocked back again so that the bale band loop 15 is in encircling relation to the end bar 3. When the buckle is rocked for the purpose of moving the extension 11 behind the band loop 15, the loop 15 passes upon the side bar 5 and on its return to the end bar 3 the more or less angular arrangement of the connection 7 tends to force the loop 15 toward the side bar 4 and there hold it, while the more or less angular connection 6 tends to force the band loop 13 toward the side bar 4, thus maintaining the looped ends of the band in substantial alinement.

The loop 15 of the bale band engages within the bight of the hook 12, and as soon as the pressure of the compress on the bale is released, the expansive force of the latter takes up the slack in the band, with the result that the end bar 3 is forcibly drawn toward the hook or shoulder 10 and also toward the side bar 4, because of the holding and directing action of the extension 11, wherefore there is no possibility of the end 3 being drawn over the outer end of the shoulder 10 to cause the straightening out of the end bar 3 and the escape of the band therefrom. Nor can the band rend under the expansive force of the bale because the extension 11 cramps the band against the end bar 3, which latter is then firmly held by both of the side bars 4 and 5. The buckle cannot spread in a direction to separate the side bars 4 and 5, because of the engagement of the hook 9 with the side bar 4. Moreover, the looped end 15 of the band cannot move sidewise in a direction away from the side 4 of the buckle because of engagement of the band by the hook 12.

The entering end of the buckle consisting of the end bar 3, side bar 4 and extension 11 is interlocking, the parts being all brought into the interlocked position automatically by the expansion of the bale in such manner that no force short of that destructive to the bale band is sufficient to cause the pulling out of any part of the buckle to an extent which will release the bale band, and the latter is effectively held from any liability of rending to any material extent.

In Fig. 5 there is shown a buckle 1ᵃ with end bars 2, 3, and side bars 4, 5, the latter joining the end bars 2 and 3 by angular connections 6 and 7, respectively. The end bar 3 crosses the side bar 4 and terminates in a slightly curved continuation 9ᵃ and the end bar 4 has a bent portion or shoulder 10 offstanding from the plane of the buckle, which bent portion instead of terminating in an extension 11 is bent upon itself as shown at 16 toward the plane of the buckle, and this bent portion 16 carries an extension 17 in the form of a practically straight bar projecting crosswise of the buckle toward that side occupied by the side bar 5, the extension 17 being of a length to project all the way or substantially all the way across the applied bale band.

In the structure of Figs. 6, 7 and 8 the arrangement shown is similar to that of Fig. 5, except that the bar 17 at its free end terminates in a hook 12ª similar to the hook 12 of Fig. 1 and associated figures, and serving a similar purpose. In Fig. 5 the arrangement is similar to that of Fig. 1, except that the hooks 9 and 12 are omitted and the bar 17 is spaced from the bar 3 by the return bend 16 of the shoulder 10. The structure of Figs. 6, 7 and 8 is similar to that of Fig. 5 except for the addition of the hook 12ª.

In Fig. 9 the body of the buckle differs from that of Fig. 1 in the rounded connections 6ª and 7ª between the side bar 5 and the end bars 2 and 3. Furthermore, the end bar 3 is substantially straight and after crossing the side bar 4 terminates in a hook 18 so disposed that when the buckle is expanded by the pressure of the bale the hook 18 will engage the outer side of the shoulder 10 instead of engaging the side bar 4. Moreover, the extension 11 extends in substantially right angular relation to the side bar 4 instead of obtusely thereto, as in Fig. 1, but terminates in a hook 12 like the hook 12 of the structure of Fig. 1.

What is claimed is:—

1. A bale band buckle of loop form having end and side bars with one end bar overlapping the corresponding side bar to constitute the entering end of the buckle, said side bar being bent into a stop for the corresponding end bar, with the bent portion having a continuation extended across the buckle to the line of the other side bar, and at its termination formed into a hook for engaging about the corresponding edge of an applied bale band.

2. A bale band buckle of loop form having end and side bars with one end bar overlapping the corresponding side bar to constitute the entering end of the buckle, said side bar being bent into a stop for the corresponding end bar, with the bent portion having a continuation extended across the buckle to the line of the other side bar, and at its termination formed into a hook for engaging about the corresponding edge of an applied bale band, the said end bar terminating at its free end in a hook to lock with the corresponding side bar.

3. A bale band buckle formed of a single piece of wire bent into a substantially closed loop having end and side bars with one end bar crossing a corresponding side bar to constitute the entering end of the buckle, said end bar being prolonged beyond the side bar it crosses and there formed into a hook to engage the side bar to prevent lateral expansion of the buckle and the side bar crossed by the end bar being formed on the side of the loop into a locking stop or shoulder, and a prolongation of said shoulder extended crosswise of the buckle outside of the loop thereof, and at the end remote from the shoulder formed into a hook returned upon itself to engage about the corresponding edge of the applied bale band.

4. A bale band buckle of loop form having end and side bars with one end bar crossing and separate from a corresponding side bar, the side bar adjacent to the point crossed by the end bar being formed into a stop for the latter and then continued to the other side of the buckle and terminating in means for engaging and holding the corresponding edge of an applied bale band, and the end bar terminating in means for engaging the side bar it crosses to prevent spreading of the buckle transversely of the length of the applied bale band.

5. A bale band buckle of loop form having end and side bars with one end bar overlapping and initially offset from the corresponding side bar to constitute the entering end of the buckle, said side bar at the end remote from the end bar carrying it being bent to form a stop for the end bar overlapping it, and then continued toward and terminating adjacent to the other side of the buckle, said continuation being spaced away from the plane of the body of the buckle on the same side thereof as the overlapping end bar by a distance to engage and clamp a bale band looped about the said end bar and hold the band against rending when the band is forced against the side bar it overlaps and against the stop on said side bar.

6. A bale band buckle of loop form having end and side bars with one end bar overlapping and initially offset from the corresponding side bar to constitute the entering end of the buckle, said side bar at the end remote from the end bar carrying it being bent to form a stop for the end bar overlapping it and then continued toward and terminating adjacent to the other side of the buckle, said continuation being spaced away from the plane of the body of the buckle on the same side thereof as the overlapping end bar by a distance to engage and clamp a bale band looped about the said end bar and hold the band against rending when the band is forced against the side bar it overlaps and against the stop on said side bar, the continuation of the end bar having its free extremity formed into a hook adapted to engage over the corresponding edge of the bale band.

In testimony, that I claim the foregoing as my own, I have hereto affixed my signature in the presence of two witnesses.

JOHN F. HALES.

Witnesses:
JOHN H. SIGGERS,
HOWARD D. ORR.

Copies of this patent may be obtained for five cents each, by addressing the "Commissioner of Patents, Washington, D. C."